United States Patent Office 3,423,219
Patented Jan. 21, 1969

3,423,219
PROCESS FOR GRINDING PORTLAND CEMENT CLINKER

James N. Stone, Jacksonville, and George H. Eick, Ponte Verda Beach, Fla., assignors, by mesne assignments, to SCM Corporation, New York, N.Y., a corporation of New York
No Drawing. Filed July 6, 1964, Ser. No. 380,691
U.S. Cl. 106—94
Int. Cl. C04b 13/30
4 Claims

---

ABSTRACT OF THE DISCLOSURE

This patent application describes an improvement in process for making portland cement. The process comprises grinding portland cement clinker at a temperature above the boiling point of water with an aqueous dispersion of at least partially saponified tall oil pitch and/or tall oil rosin, the dispersion having 15–70 percent by weight non-volatile matter and 30–85 percent by weight of water, the dosage being sufficient to leave a residue of 0.01–0.5 percent by weight based on the resulting cement.

---

This invention relates to pulverulent portland cement having improved properties, and to a process for making same.

Heretofore it has been proposed to grind portland cement-clinker with minute proportions of whole tall oil, as has been disclosed in U.S. Patent 2,420,144. However, the tall oil has an objectionable odor and color and, because of its oily nature, very small proportions are difficult to disperse uniformly in the much larger warm clinker quantity being pulverized and require significant input of grinding energy to achieve effective dispersion for air entrainment, reduced water absorption, and homogeneity for strength maintenance of the resulting concrete. Other investigators have proposed grinding portland cement-clinker with fatty acids and the like which react with cement, such as oleic acid, but again such acids are generally difficult to disperse and furthermore are generally uneconomical to use in effective concentrations. Additionally, the resulting concretes produced from such cement can show little or no air entrainment or erratic entrainment which can adversely affect concrete strength and require undesirable control procedures.

We now have discovered that portland cement-clinker can be ground with certain inoffensive aqueous dispersions to yield simply and easily cement of good appearance in conventional grinding equipment and processing, which cement contains an intimately mixed, substantially uniform additive residue for imparting a desirable degree of air entrainment and enhanced water-repellency in concretes, masonry cements, and concrete mortars made therefrom without significant sacrifice of compressive strength in such concretes, etc. Additionally our aqueous dispersions increase clinker grinding efficiency as by increasing grinding fineness without requiring a substantially greater grinding energy input. The resulting portland cement is particularly suitable for use in preparing structures generally, e.g., paving, pipe, and concrete masonry units such as concrete block as well as concrete mortars used therewith, which materials often must combine air entrainment and strength with water-repellency while creating a pleasant visual effect such as in retaining walls, corridors, and lobbies. Our additives additionally can impart a desirable external texture to such masonry units as well as often increasing the output of blocks per batch, reducing aggregate segregation, providing faster and cleaner mold release (lubricity), and imparting shorter compaction (finish) time.

Broadly, our pulverulent portland cement contains about 0.01–0.5 weight percent of diffuse, sorbed residuum from a dispersion in water of about 15–70% of pinaceae heavy ends; the dispersion contains at least about 0.1%, on a weight basis of such heavy ends, of equivalent alkali metal hydroxide and about 0–15%, on a similar heavy ends weight basis, of protective colloid. More particularly the above dispersion contains about 0.1–5%, on a weight basis of the heavy ends, of equivalent alkali metal hydroxide and about 0.1–15%, on a similar heavy ends weight basis, of protective colloid, the amount of said colloid being sufficient to stabilize the dispersion against heavy ends agglomeration and consequent separation. Additionally, as another aspect of our invention, the dispersion can be free from the addition of protective colloid in which instance the dispersion contains about 20–40%, on a weight basis of the heavy ends, of equivalent alkali metal hydroxide. Our process comprises grinding portland cement-clinker with the above described dispersions to yield the inventive cement.

Conventionally, the term "portland cement" covers various categories of cement such as types for use in general concrete construction and mortar preparation, as well as more specific concrete types for use in particular concrete applications, e.g., for use where high sulfate resistance, high early strength, low heat of hydration, or moderate sulfate action or heat of hydration is required. Consequently, the term as used herein should be construed as including all categories of cement that are associated with such term. The most common types of portland cement that have been recognized in the U.S. are described in ASTM C 150–63, C 175–61, C 205–61T and C 340–58T.

By pinaceae heavy ends we mean acid resins and acid pitches and tars, as well as mixtures of such various resins, pitches and tars obtained from the trees or portions thereof of the pinaceae family, e.g., pines, hemlocks, spruces, larches, balsams and firs, said acidic materials having sufficiently low vapor pressure to have boiling point not substantially below about 240° C. at 3 mm. Hg absolute. Thus, for example, suitable heavy ends are gum rosin, wood rosin, tall oil rosin, various rosin pitches and particularly, for efficiency and economy, the high boiling fractions from the distillation of tall oil, e.g., tall oil rosin, tall oil pitch and their mixtures.

Tall oil rosin includes mixtures of abietic and pimaric type acids and generally such related isomers as differ from abietic acid in either the number or location of the double bonds, or in the structure of the side chain. The rosin conventionally has an acid number between about 150–180. Pitches such as tall oil pitch, for example, can be at least partially composed of compounds formed during distillation such as polymerized resin acids. The acid number of tall oil pitch is conventionally not substantially above about 120 and the saponification number is generally about 140 or lower.

We have found that blending pitch and rosin to form mixtures can be useful and is suitably accomplished prior to forming the dispersion. Where mixtures of such heavy ends are used, we have found it advantageous from a manufacturing standpoint that they consist of about 55–80 weight percent tall oil rosin and the balance tall oil pitch. Such mixtures can be obtained as a bottoms fraction from controlled tall oil distillation or by blending a distillate rosin fraction with the undistilled pitch fraction. However, for efficiency and economy in cement treating we prefer to use mixtures wherein a preponderant proportion of the pinaceae heavy ends consist of tall oil pitch, e.g., 90% or more and even up to 100%.

In one aspect of our invention we prepare our aqueous dispersion, hereinafter for convenience called an "admix," from these pinaceae heavy ends according to such methods as have been previously disclosed in the paper sizing art and particularly with respect to the methods as have been described in U.S. Patent 1,882,680 to Wieger. This patentee describes a process of adding small amounts of alkali to a melted pine rosin to saponify a small portion of the rosin in preparation for forming what is generally termed a high free rosin size. The rosin so prepared is maintained at a temperature of about 80° to 90° C. while a solution of a protein and caustic soda is added followed by the addition of water to cool the resulting mixture. The water addition is conventionally continued to yield a paper size containing about 55% water. In our practice, we obtain such resulting dispersions as have about 15–70% of dispersed material and for efficiency and economy prefer to form and use those containing about 20–45%.

We also can prepare aqueous dispersions having greater than 90%, e.g., even up to 100% saponification. The resulting aqueous materials can conveniently be called colloidal solutions but such materials are meant to be included when the use of the term "dispersion" is used hereinabove or hereinbelow. These particular dispersions exhibit excellent freeze-thaw stability and can be readily handled and stored under fluctuating weather conditions. It is thus uneconomical and generally unnecessary to use a protective colloid and prepare a protein solution with such dispersions. As a result such dispersions can be quickly and simply prepared as by neutralizing warmed (90–130°) pinaceae heavy ends with equivalent alkali metal hydroxide aqueous solution. For enhanced stability and efficiency of operation we prefer such dispersions to be at least about 95% saponified. Again, we obtain dispersions that have about 15–70% of dispersed material, while, for efficiency and economy, we prefer to form and use those containing about 20–45%.

For saponification of the pinaceae heavy ends, we use at least about 0.1%, on a weight basis of such heavy ends, of equivalent alkali metal hydroxide, e.g., an alkali metal hydroxide such as sodium hydroxide or equivalent water-soluble base or their mixtures. For the partially saponified protein solutions we use about 0.1–5%, on the weight basis of the heavy ends, of the equivalent alkali metal hydroxide. When a protein is not used and substantial saponification, e.g., 90% or more, is desired, we find that using about 20–40% of such hydroxide, on a heavy ends weight basis, insures the formation of a colloidal solution which demonstrates excellent freeze-thaw stability. Further suitable equivalent water-soluble bases include potassium hydroxide, sodium carbonate, sodium aluminate, ammonium hydroxide, and generally any amine base such as an alkyl or alkanol amine suitable for neutralization such as triethanolamine.

For the stabilization of the partially saponified dispersions, e.g., for greater shelf stability including, in many instances, enhanced freeze-thaw stability, we use about 0.1–15% of a protective colloid, the percentage being again based on the weight of the pinaceae heavy ends. Colloids which we can and have used include casein, soya bean protein, egg albumin, gum arabic, starch, gelatin, water soluble methyl cellulose, animal glue, dextrines, and sodium alginate.

For added storage life of the protective colloid in the admix we can use a pesticide such as a fungicide generally in proportion of about 0.01 to 1.0% of fungicide based on the total weight of the admix. Fungicides which we can and have used include phenyl mercury acetate, "Vancide" (which is the trademark for an aqueous solution of the salts of mercaptobenzothiazole and dimethyldithiocarbamic acid), "Butrol" (a trademark for the following composition: 10% phenylmercuric acetate, 50% potassium orthophenylphenate, and the balance inerts), "Busan 901" (which is a trademark for the mixture of: 12.7% disodium cyanodithiomidocarbonate, 4.8% ethylenediamine, 17.5% potassium N-methyldithiocarbamate, and the balance inerts), and N-(3-chloroallyl) hexaminium chloride, made by reacting hexamethylenetetraamine with a halohydrocarbon. For efficiency and economy we prefer to use about 0.2% of N-(3-chloroallyl) hexaminium chloride.

To be well distributed throughout the cement our admix must be easily and thoroughly mixed during conventional grinding of the clinker. Because the product is in a dispersed state, it blends quickly and efficiently with the cement-clinker in the normal machine pulverizing operations, e.g., by ring-roller milling at about 125° C. with or without subsequent tube milling, or ball milling followed by tube milling, or by compartment milling, both handled conventionally at about 120–130° C. In such operation the use of our admix should not be construed as precluding the addition to the clinker during pulverizing of other desirable or conventional compounds such as gypsum, which is often used at this stage to boost the $SO_3$ content in the cement for retardation of set, or pozzolan for its special properties.

The admix is blended with the cement-clinker as an aqueous dispersion and is, therefore, subject to at least partial dehydration in the clinker grinding at elevated temperature, above 100° C., and generally at about 125° C. or higher. Preferably, for efficient grinding, the admix is added directly to the primary grinder, but, if desired, it can be added to the clinker prior thereto. Because of the dehydration we generally describe the clinker after grinding as containing a sorbed residuum from the dispersion. By residuum we mean the ingredients of the admix which are less volatile than water, e.g., the heavy ends, the alkali metal hydroxide equivalent, and the protective colloid whether reacted, occluded, absorbed or adsorbed.

We have found it necessary to incorporate from about 0.01–0.5% of such residuum into the cement, calculated on a weight basis of the oven-dried resulting cement. This amounts to about 0.012 to 1.63 parts of admix per part of the clinker and mineral grinding additives such as gypsum. Using less than about 0.01% of the residuum will not provide sufficient admix to ensure the enhanced benefits such as water repellency that the cement imparts to concrete. Using greater than about 0.5 weight percent of such residuum can adversely affect the strength of resulting concrete, reducing it to below tolerable limits. For efficiency in blending and economy of operation we prefer to incorporate about 0.05–0.2% of such residuum; which amounts to about 0.06 to 0.65 part of admix per part of clinker and mineral grinding additives such as gypsum.

Our admixes generally are dispersions of small particle size, e.g., they have average particle size within the about one to two micron range. We find that usually not more than 1–2% of the dispersed particles have a diameter greater than 10 microns, and we prefer to have a preponderant portion, i.e., about 75–80% of our additive particles within a size range of 1–2 microns for best fluidity and stability of the admix.

The following examples show ways in which the invention has been practiced, but should not be construed as limiting the invention. In this specification all percentages are weight percentages, all parts are parts by weight, and all temperatures are in degrees centigrade unless otherwise specified.

Example 1

Three hundred and thirty parts of tall oil pitch having 28% free rosin acids, 29% unsaponifiables, 6% fatty acids, an acid number of 55 and a saponification number of 110 were melted in a kettle with continuous agitation and with heating until a stable temperature of 120° was reached. A solution of 5.4 parts of NaOH in 10 parts of water was added to the pitch sample for reaction therewith.

Next 7 parts of casein were soaked in 20 parts of water at room temperature for 10 minutes. While stirring, the casein slurry was combined with 1.3 parts of a 50% NaOH solution and the resulting mixture heated slowly to 70°. When the casein was completely dispersed to a uniform mixture, sufficient tap water was added to bring the total mixture to a weight of 85 parts. The resulting dispersion was allowed to cool to 32°, then mixed with 1.3 additional parts of 50% NaOH solution to form a final casein dispersion.

The resulting casein-NaOH dispersion was poured into the partially saponified tall oil pitch, which had first been cooled from 120° down to 100°, the combining being done at first very slowly until a drop in the level of the contents in the kettle was observed. The balance of the dispersion was then poured in at a faster rate. During this addition the temperature in the kettle was held above 86°. After all of the casein-NaOH dispersion was added the mixture was allowed to cook for 10 minutes at a temperature of 90°.

After cooking, warm water at a temperature of 38° was added to the mixture with agitation to form a stable aqueous mixture having a continuous aqueous phase and to concomitantly reduce the solids content of the mixture to a value of 45%. Over 70% of the solids in the resulting dispersion had particle size of 1–2 microns or less. As the viscosity of the mixture decreased, cooler water could be used if desired. Based on the total weight of the admix thus formed, 0.2% of a fungicide (Butrol), was added.

Portland cement-clinker that had been removed from a kiln and cooled was conveyed in batches to a series of pulverizing mills. Prior to entering the mills 4% of gypsum rock, based on the weight of the clinker was added to all batches, and 0.06% of the above formed admix, also based on the weight of the clinker, was added to randomly selected batches. The grinding operation in all cases reduced the clinker to a powder, 90% of which passed through a 200-mesh screen and blended the admix thoroughly and intimately with the clinker. Admix-containing clinker was observed to grind more readily and the resulting cement product had practically conventional color, uniform appearance, and no objectionable odor.

Comparative concrete batches were prepared under uniform conditions and in similar manner except that a random portion of the batches were made from pulverized portland cement clinker containing no admix, which batches were used for control purposes, whereas the remaining batches were made from the above pulverized portland cement-clinker having the admix intimately and thoroughly blended therewith. From the batch mixer all resulting plastic cohesive batches were passed through a compacting and forming operation to produce concrete cylinders 12″ high and 6″ in diameter. All resulting cylinders were air cured for 28 days.

Water-repellency was shown through the low moisture absorption of randomly selected air-cured cylinders. The manner for determining moisture absorption was that specified in ASTM C 140–63T. Individual control cylinders showed moisture absorption within the range from 8.0 to 8.25% as compared to admix cylinders which tested at individual readings within the desirably low range from 4.73–4.83% absorption.

Additionally, control plus admix clinker portions were used with sand, water, and aggregate to produce hydraulic cement mortars according to the specifications of ASTM C 109–58 for the purposes of measuring the compressive strength of comparative samples according to such specifications. Results were of importance to determine if the admix adversely affected compressive strength, as often happens with portland cement agents. The average compressive strength determined for the control samples was 2340 p.s.i., while the average for similarly random samples of admix mortar was a quite remarkable 2450 p.s.i., which increase was a totally unexpected benefit derived from the admix.

Example 2

A 330 part sample of the tall oil pitch described in Example 1 was melted in a kettle equipped with a thermometer and stirrer and the temperature stabilized at 130°. A solution of 120 parts of NaOH in 220 parts of water was added to the pitch sample for reaction therewith. During the addition of the solution the temperature in the kettle was held at 90° and after all the NaOH solution had been added the resulting mixture was allowed to cook for 10 minutes at 90° to form a completely saponified colloidal solution.

After reaction, warm water at a temperature of 38° was added to the colloidal solution with agitation to reduce the mixture to a 20% total solids content. About 90% of the solids had average particle size of 1–2 microns and less. Based on the total weight of the admix, 0.2% of a fungicide which was N-(3-chloroallyl)hexaminium chloride was added.

Portland cement clinker that had been removed from a kiln and cooled was conveyed to a series of pulverizing mills. Prior to entering the mills, 4% of gypsum rock, based on the weight of the clinker, was added to the clinker. The resulting product entered the mills in batch operation; to randomly selected batches there was added 0.011 weight percent solids (in a 20% solids dispersion), based on the weight of the resulting gypsum-clinker product, of the admix described in Example 1. The remaining batches were mixed with 0.011% of a similar 20% solids dispersion and on a similar weight basis of the admix described above. The grinding operation reduced the clinker batches to a powder 90% of which passed through a 200-mesh screen, which operation exhibited an economical reduction in grinding time attributable to the admix and additionally blended the additives thoroughly and intimately with the clinker.

Hydraulic cement mortars were made from portions of all batches according to the specifications of ASTM C 185–59 and the resulting mortars were checked for air content according to the specifications of ASTM C 185–59. The results are listed in the table below.

Additional ground clinker portions were used for producing hydraulic cement mortars as described in ASTM C 109–58 and these mortars were treated according to such standards to determine their compressive strength; the results of these tests are listed in the table below.

Test specimens of comparative concrete masonry units were produced from portions of the above ground clinkers and after air-curing for 28 days, randomly selected samples were used for determining water absorption according to the specifications of ASTM C 140–63T; again results are listed in the table below.

| Admix | Percent air entrainment | Compressive strength, p.s.i., 28-day air-cured | Water absorption |
|---|---|---|---|
| Ex. 1 Admix | 14.39 | 6,767 | 4.83 |
| Ex. 2 Admix | 14.17 | 7,157 | 4.73 |

Both admixes thus achieved excellent compressive strength in their respective mortars while producing a desired amount of air entrainment with its particular advantages. Further, water absorption was held within good limits.

A proprietary compound of substantially hydro-aromatic acids plus fatty carboxylic acids, which compound was derived from a paper manufacture process and alkali neutralized was used in Portland cement grinding in a manner similar to that described above in Example 2 in a proportion of 0.008%, on a weight basis of the grinding mixture, and as a 20% solids content aqueous dispersion. This resulting hydro aromatic-fatty carboxylic acid mixture in Portland cement was used to produce mortars, as above, but such mortars exhibited compressive strength after the 28 days of air curing of only 6267 p.s.i. in the test prescribed by ASTM C 109–58, and thus considerably below that achieved by the inventive admixes.

Additionally, air entrainment of the mortar so prepared, measured as above, was 19.88%, thus considerably off the about 14% entrainment considered as excellent for many mortar and concrete applications. Moreover, water absorption, also measured as described above, increased to 4.9, thereby increasing the chances for producing unattractive efflorescence on mortar surfaces.

We claim:
1. In a process for grinding Portland cement clinker to yield a pulverulent Portland cement product, the improvement which comprises conducting said grinding at a temperature above the boiling point of water with an aqueous admix sufficient for yielding about 0.01 to 0.5% residue based on the weight of said pulverulent Portland cement product, said admix consisting essentially of a stable aqueous dispersion of partially saponified pinaceae heavy ends selected from the group consisting of tall oil pitch and tall oil rosin and mixtures thereof, the preponderance of said pinaceae heavy ends being dispersed in the uncombined particulate state, said admix containing about 15-70% of said heavy ends, about 0.1-5% basis weight of said heavy ends, of equivalent alkali metal hydroxide and about 0.1-15%, basis weight of said heavy ends, of protective colloid.
2. The method of claim 1 wherein said pinaceae heavy ends consists essentially of tall oil rosin.
3. The method of claim 1 wherein said pinaceae heavy ends consists essentially of tall oil pitch.
4. The pulverulent Portland cement product produced by the process of claim 1.

References Cited

UNITED STATES PATENTS

| | | | |
|---|---|---|---|
| 2,225,149 | 12/1940 | Bechtold et al. | 106—94 |
| 2,370,983 | 3/1945 | Miller | 106—94 |
| 2,483,806 | 10/1949 | Buckley et al. | 106—96 |
| 2,510,776 | 6/1950 | Gabrielson | 106—94 |
| 2,521,073 | 9/1950 | Ludwig | 106—94 |
| 3,208,863 | 9/1965 | Eick et al. | 106—94 |

FOREIGN PATENTS

| | | |
|---|---|---|
| 572,817 | 10/1945 | Great Britain. |
| 590,643 | 7/1947 | Great Britain. |
| 727,280 | 3/1955 | Great Britain. |

OTHER REFERENCES

Barton: Air-Entraining Cement Manufacture," Rock Products, November 1944, pp. 39, 112.

TOBIAS E. LEVOW, *Primary Examiner.*

S. E. MOTT, *Assistant Examiner.*

U.S. Cl. X.R.

106—102